United States Patent Office 3,646,082
Patented Feb. 29, 1972

3,646,082
PROCESS FOR OPTICALLY RESOLVING DL-
GLUTAMIC ACID AND SALTS THEREOF
Kenkichi Ito, Sagamihara, Naomasa Mizoguchi, Tokyo,
Miyoji Dazai, Kawasaki, and Osahiro Sato, Yokohama,
Japan, assignors to Ajinomoto Co., Inc., Tokyo, Japan
No Drawing. Continuation-in-part of abandoned application Ser. No. 636,013, May 4, 1967. This application Sept. 4, 1970, Ser. No. 69,992
Claims priority, application Japan, May 21, 1966,
41/32,402
Int. Cl. C07f 3/06
U.S. Cl. 260—429.9   9 Claims

ABSTRACT OF THE DISCLOSURE

When a solution supersaturated with DL-glutamic acid (GA) and containing DL-glutamic acid hydrochloride (GA–HCl) is seeded with L-glutamic acid, and the seeded enantiomorph is thereby crystallized in a first crop of crystals, the solubility of D–GA–HCl in the solution is decreased and the solubility of L–GA–HCl is increased. If the solution is in a condition in which it is compatible with both GA and GA–HCl in the crystalline form, a second crop of D–GA–HCl crystals may therefore be produced simultaneously with the L–GA crystals, or L–GA–HCl may be preferentially dissolved by the solution from crystalline DL–GA–HCl, leaving the D–GA–HCl behind. The solution remains approximately balanced as to L- and D-forms and the undesired enantiomorphs do not tend to crystallize spontaneously. The crystals of the two different compounds are readily separated. D–GA and L–GA–HCl are obtained by seeding the original solution with D–GA. GA–HCl may be replaced in this mechanism by GA–HBr or the zinc and ammonium salts of GA which form conglomerates of the optically active forms when crystallized in the DL form, but those salts of DL–GA whose crystals are racemates are unsuited for the process.

This application is a continuation-in-part of our copending application Ser. No. 636,013, filed on May 4, 1967, and now abandoned.

This invention relates to the optical resolution of DL-glutamic acid and its salts, and particularly to optical resolution by seeding a saturated or supersaturated solution of the optically inactive DL-form with one of the enantiomorphs.

It is known to crystallize the optically active L-form of glutamic acid from a saturated or supersaturated solution of the optically inactive DL-form. As the desired enantiomorph is crystallized, the mother liquor is correspondingly enriched with the undesired and unseeded D-enantiomorph, and the latter tends to crystallize spontaneously and to contaminate the crop of L-glutamatic acid. The same, well-known problem exists whenever it is desired to resolve an optically inactive mixture of the enantiomorphs by preferential crystallization of one enantiomorph from a supersaturated solution.

L-glutamic acid and its salts are important intermediates in the synthesis of monosodium L-glutamate, and the optical resolution of the inactive forms has been attempted on an industrial scale for more than a decade. The known processes are relatively complex and require costly equipment since they rely on a separation of the seeded enantiomorph from the mother liquor before the unseeded enantiomorph can contaminate the crop by spontaneous crystallization. For the sake of convenience, this introductory discussion relates mainly to seeded crystallization of L-glutamic acid, but is applicable in an obvious manner to D-glutamic acid as well.

We now have found that it is possible to crystallize L-glutamic acid from an aqueous solution at least saturated with DL-glutamic acid by seeding without simultaneously increasing the tendency of the unseeded D-glutamic acid to crystallize spontaneously.

This invention is based on the finding that a solution of DL-glutamic acid which also contains one of certain salts of DL-glutamic acid is capable of dissolving more of the L-form of the salt as the L-form of the free acid is crystallized by seeding while the solubility of the D-form of the salt in the solution decreases. It is possible simultaneously to crystallize the D-form of the salt with the L-form of the free acid, and thereby completely to suppress the tendency of the D-glutamic acid and of the L-form of the salt to crystallize spontaneously from the mother liquor. The equilibrium of the optically active forms of the free acid and of the salt in the mother liquor may also be maintained by dissolving more of the L-form of the salt from solid material in contact with the mother liquor. If the solid material is the DL-form of the salt, ultimately there may be obtained a solid mixture of newly crystallized L-glutamic acid, and of newly crystallized and residual salt of D-glutamic acid while the two enantiomorphic forms remain in substantial equilibrium in the solution. The free L-glutamic acid and the salt of D-glutamic acid are different compounds which may readily be separated because of their different properties, such as their solubilities in water and other solvents.

The procedure described above is applicable to all water-soluble salts of DL-glutamic acid which form conglomerates of the optically active forms when in the solid, crystalline state, and is not successful with salts of DL-glutamic acid which are racemates. The term "salts of glutamic acid" is to be understood broadly to include glutamates and addition salts of glutamic acid with strong acids. Among the commercially available salts of glutamic acid, the zinc and ammonium glutamates and the addition salts with hydrogen chloride and hydrogen bromide are suitable for simultaneous resolution with free DL-glutamic acid, and the sodium, calcium, barium glutamates, and the acid addition salt with sulfuric acid are unsuited. It will be appreciated that the mother liquor must be simultaneously compatible with both crystalline materials to make the method feasible.

The manner in which the optically active forms of glutamic acid and of its salts affect the solubilities of each other will be apparent from the following phenomena.

When a solution supersaturated with DL-glutamic acid and saturated with DL-glutamic acid hydrochloride is seeded with L-glutamic acid, the L-glutamic acid crystallizes. If the mother liquor is then seeded with D-glutamic acid hydrochloride, the seed crystals grow. If the mother liquor, however, is seeded with L-glutamic acid hydrochloride, the seed crystals dissolve.

When the L-glutamic acid crystals are separated from the mother liquor after seeding, and the liquor is brought in contact with DL-glutamic acid hydrochloride, the L-form of the salt is preferentially dissolved from the solid phase, and the D-form is precipitated. When crystallization stops, the mother liquor does not show optical rotation.

Analogous results are obtained when the roles of glutamic acid and of its hydrochloride are interchanged in the above.

The method of the invention as outlined above is capable of numerous variations and permutations which will become evident as the disclosure proceeds. In its broader aspects, it permits DL-glutamic acid or a salt of DL-glutamic acid to be resolved optically by preparing an aqueous solution of two compounds, namely DL-glutamic acid and a salt of DL-glutamic acid, the salt being a water-soluble glutamate or a water-soluble strong acid salt of glutamic acid. The salt, when in the solid form, must be a mechanical mixture or a conglomerate of the optically active enantiomorphs of the salt, and not a racemate.

The solution is made supersaturated with respect to a first one of the two optically inactive compounds and seeded with seed crystals of one optically active enantiomorph of the first compound. The seeded enantiomorph is permitted to crystallize on the seed crystals to form a first crop of crystals, whereby the solubility of the corresponding optically active enantiomorph of the second compound in the residual solution is increased, and the solubility of the optically active enantiomorph of the second compound in the residual solution is decreased.

From here, two ways may be followed. The residual solution may be made supersaturated with respect to the second compound until a second crop of crystals of the opposite enantiomorph is formed. The two crystal crops are then separated from each other.

Alternatively, the residual solution resulting from crystallization of the seeded enantiomorph of the first compound may be contacted with the second compound in the crystalline solid state until the corresponding enantiomorph is dissolved from the solid compound in an amount sufficient so that a residual second crystal crop enriched with the opposite enantiomorph of the second compound is left in the solid state. The two crystal crops are then separated as mentioned above.

Actually, the two procedures and the several steps of the same may be performed simultaneously. Thus, a solution saturated with the two compounds may be seeded simultaneously or sequentially with the opposite respective enantiomorphs of the two compounds. Either compound may be seeded, and the other permitted to crystallize spontaneously. Where a solid body of the unseeded compound in the DL-form is in contact with the saturated solution from which an enantiomorph of the seeded compound precipitated, the solid phase is normally enriched with the opposite enantiomorph of the unseeded compound not only by dissolution of the corresponding enantiomorph, but also by crystallization of the opposite enantiomorph from the saturated soution, the solid phase acting as a seed material.

The specific mechanism by which resolution is achieved will thus be understood to depend on operating conditions, and to be capable of much variation.

The following examples are further illustrative of the invention, but do not exhaust the modifications and permutations of which the method of the invention is obviously capable.

EXAMPLE 1

An aqueous solution saturated at 30° C. with DL-glutamic acid, hereinafter referred to as DL-GA, and DL-glutamic acid hydrochloride (DL-GA-HCl) and weighing one kilogram was mixed with 166 g. crystalline DL-GA-HCl (equivalent to 134 g. GA), 141 g. DL-GA monohydrate (equivalent to 125 g. GA), and 20 g. D-glutamic acid (D-GA) seed crystals. The mixture was agitated at 30° C. for five hours.

The solids were then separated from the residual liquid, washed with methanol, dried, and found to weigh 290 g. The liquid was found to lack significant optical activity.

The dried solid material was agitated at room temperature for some time with 480 g. water, and the undissolved material was filtered off, washed with 50 g. cold water, and dried. It weighed 130 g. The washings were combined with the filtrate, and the combined liquids weighed 690 g.

The last-mentioned undissolved material was found to have a nitrogen content of 9.52%, and therefore was pure glutamic acid. It had a specific rotary power of $[\alpha]_D^{22} = -30.8$, indicating that its optical purity was 96.2% (based on a known value of 32.0 for pure D-GA), and that it consisted of 125 g. D-GA and 5 g. DL-GA.

The combined washings and filtrate were found to contain 1.8% N and 4.5% HCl, that is, 16.7% L-glutamic acid almost entirely in combined form at a mole ratio of 0.962 HCl per 1 GA. As was calculated from these values and confirmed by evaporation of a sample to dryness, the combined liquids contained 115 g. L-GA and 15 g. DL-GA in the salt form with minor amounts of free acid.

In this procedure, the original solution was made supersaturated with respect to DL-GA by the dissolution of the DL-GA monohydrate crystals. Upon seeding with D-GA, the solution was made supersaturated with respect to L-GA-HCl by the precipitation of the seeded enantiomorph, and L-GA-HCl crystallized on the solid DL-GA-HCl while D-GA-HCl was dissolved from the latter. The first filtration separated the two crystal crops from a residual liquor in which practically equivalent amounts of L-GA and D-GA-HCl optically balanced each other. The D-GA and L-GA-HCl were separated from each other on the basis of their very different solubilities in water.

EXAMPLE 2

1050 g. DL-GA-HCl were dissolved in 1500 g. water to form a solution saturated at 23° C. There were added 366 g. DL-GA-HCl crystals passing through a 170-mesh screen, and 450 g. DL-GA monohydrate. The resulting slurry was seeded with 150 g. coarse L-GA crystals (not smaller than 24 mesh) and stirred at constant temperature for 48 hours.

The solids were recovered by filtration, washed with methanol, and dried. The crystalline material was fractionated on a 24-mesh screen. The coarse fraction weighed 426.5 g. and consisted of L-GA having an optical purity of 97.5%, and the fines consisted of D-GA-HCl having an optical purity of 90.2% and a small amount of GA.

EXAMPLE 3

A saturated solution of 104 g. DL-GA-HCl in 100 g. water, saturated at 50° C., was mixed with 50 g. DL-GA-HCl and 11 g. DL-GA monohydrate at that temperature. The slurry so obtained was further mixed with 10 g. L-GA seed crystals. During the subsequent crystallization of L-GA and D-GA-HCl, 40 g. DL-GA monohydrate crystals were added over a period of four hours while a temperature of 50° C. was maintained. Stirring was continued until ten minutes after the last addition whereupon 100 g. hot water were added to dissolve the D-GA-HCl, and the remaining solids were recovered by filtration after two minutes.

The solid material, when washed with methanol and dried, weighed 41.6 g. and was found to have an optical purity of 96.1% based on L-glutamic acid. The combined filtrate and washings weighed 414.5 g. and were found to contain D-GA-HCl corresponding to 30 g. D-GA.

EXAMPLE 4

255 g. monoammonium DL-glutamate (DL-NH$_4$-G) monohydrate and 75 g. water were mixed at 50° C., and 11 g. DL-GA monohydrate were added to form a slurry which was thereafter seeded with 15 g. L-GA. During the subsequent crystallization period of eight hours at 50° C., 50 g. DL-GA monohydrate were gradually added with agitation, and agitation was continued 15 minutes beyond the last addition. Thereafter, 100 g. hot water were added to dissolve the precipitated D-NH$_4$-G.

Upon prompt filtration, washing, and drying, 55 g. crystalline material having an optical purity of 92.4% and essentially consisting of L-glutamic acid were recovered. The combined filtrate and washings weighed 497 g. and contained D-glutamate equivalent to 35.8 g. D-GA.

EXAMPLE 5

2.5 g. zinc DL-glutamate (Zn-DL-G) and 4.7 g. DL-GA were dissolved in 100 g. water to produce a solution saturated at 30° C. At that temperature, the solution was mixed with 25 g. crystalline Zn-DL-G dihydrate and 5 g. L–GA seed crystals. During the subsequent crystallization period of six hours, 14.8 DL–GA monohydrate were gradually added with agitation, and stirring was continued for ten minutes whereupon 54 g. aqueous 10% sodium hydroxide solution were added and stirring was continued for two more minutes to dissolve the precipitated GA.

The crystals recovered by filtration were washed with water and dried. They weighed 22 g., consisted essentially of Zn–D–G dihydrate, and had an optical purity of 85%. The combined filtrate and washings had an optical activity corresponding to that of 16 g. L–GA.

EXAMPLE 6

A solution saturated at 23° C. was prepared from 130 g. NH₄–DL–G monohydrate and 85 g. water. It was mixed with 29 g. NH₄–DL–G monohydrate crystals and 30 g. DL–GA monohydrate. The resulting slurry was seeded with 10 g. L–GA and agitated isothermally for 48 hours. The crystals present were then separated from the mother liquor by filtration and washing with methanol and dried. They weighed 61.5 g.

The crystalline material was suspended by agitation in 50 g. hot water for two minutes, and the suspension was filtered. The remaining solids recovered by filtration were washed with cold water, dried, and found to consist essentially of L–GA weighing 31.5 g. and having an optical purity of 95.9%. The combined filtrate and washings weighed 100 g. contained the NH₄–D–G, and had an optical activity corresponding to 20.2 g. D–GA.

EXAMPLE 7

242 g. DL–GA–HCl and 200 g. water were combined at 60° C. to form a saturated solution at 60° C. which was mixed sequentially with 100 g. DL–GA–HCl, 22 g. DL–GA monohydrate, and 20 g. L–GA seed crystals. During the subsequent crystallization period of four hours, 28 g. aqueous 30% sodium hydroxide solution were gradually added with agitation to dissolve DL–GA–HCl and keep the solution supersaturated with GA. Ultimately, 50 g. hot water were added to dissolve the D–GA–HCl, and the mixture was filtered after two minutes.

The crystals recovered by filtration, washing with methanol, and drying weighed 50.8 g., and essentially consisted of L–GA having an optical purity of 93.2%.

30.6 g. DL–GA monohydrate were gradually added to the filtrate with agitation at 60° C. over a period of four hours, and stirring was continued for 30 minutes thereafter. The crystals formed were filtered off, washed with methanol, and dried. They weighed 27.8 g., had an optical purity of 98.3%, and essentially consisted of D–GA.

The filtrate separated from the D–GA contained 11.05% HCl and 3.95% nitrogen, and had practically no rotatory power.

EXAMPLE 8

A solution of 104 g. DL–GA–HCl in 100 ml. water was kept at the saturation temperature of 50° C., and 60 g. crystalline anhydrous DL–GA having a particle size smaller than 170 mesh and 10 g. L–GA–HCl seed crystals (24 mesh +) were added. The resulting slurry was mixed over a period of four hours with 22 g. 35% hydrochloric acid. The mixture was then filtered.

The recovered solids were washed with methanol, dried, and fractionated by means of a 60-mesh screen. The coarse fraction weighed 34 g., and consisted of L–GA–HCl having an optical purity of 92.7%. The fines consisted of 19 g. D–GA having an optical purity of 89.5%.

EXAMPLE 9

A slurry was prepared by heating 235 g. NH₄–DL–G monohydrate and 75 g. water almost to a boil and cooling the mixture to 50° C. At this temperature 11 g. DL–GA monohydrate were added with agitation, and 30 minutes later 5 g. L–GA seed crystals. During the subsequent crystallization period of four hours, 10.7 g. aqueous 35% sulfuric acid solution were added with agitation while the temperature was maintained at 50° C. Thereafter, 50 g. hot water were added and agitation was continued for two minutes.

The crystals recovered by filtration, washing with methanol, and drying weighed 16 g. and consisted essentially of L–GA having an optical purity of 93%. The filtrate contained 9.52 g. D-glutamic acid mainly in the form of the salt, as calculated from optical rotation values.

EXAMPLE 10

5.9 g. Zn–DL–G dihydrate and 11 g. DL–GA monohydrate were dissolved in 98 g. hot water. 25 g. Zn–DL–G dihydrate and 5 g. L–GA seed crystals were stirred into the solution at 50° C., and 9.9 g. aqueous 50% sulfuric acid were added gradually with agitation during the subsequent crystallization period of six hours. Thereafter, 52 g. aqueous 6.5% sodium hydroxide solution were added and agitation was continued for two minutes.

The crystals recovered by filtration, washing with water, and drying consisted essentially of 12.5 g. Zn–D–G dihydrate having an optical purity of 94%. The filtrate was found from optical rotation values to contain 11.6 g. L–GA, including the seed crystals.

EXAMPLE 11

5 g. DL–GA were dissolved in 100 g. water at 60° C. The solution was cooled to 50° C. and sequentially mixed with 5 g. L–GA and 107 g. DL–GA–HCl. while a temperature of 50° C. was maintained, 17.3 g. aqueous 30% sodium hydroxide were added over a period of four hours while 60.4 g. water were simultaneously removed by evaporation in a vacuum. Agitation was then continued for 30 minutes, and the mixture was filtered.

The solids, when washed with methanol and dried, weighed 59 g. and were found to consists of 29.2 g. GA and 29.8 g. GA–HCl by analysis for HCl and nitrogen. They were agitated at 40° C. with 50 ml. aqueous, saturated GA solution for two minutes. The GA–HCl dissolved, and the undissolved material was recovered and found to consist essentially of 29.1 L–GA having an optical purity of 95.2%. 22.7 g. D–GA as the salt were found in the liquid.

EXAMPLE 12

A solution of DL–GA–HCl and DL–GA saturated at 60° C. and weighing 236 g. was prepared from water and an excess of both compounds in crystalline form. The solution was mixed with 5 g. L–GA seed crystals and 5 g. D–GA–HCl seed crystals and cooled from 60° C. to 30° C. in four hours while 14.1 g. aqueous 30% sodium hydroxide solution were gradually added to replenish the solution with GA. Agitation was continued thereafter for 30 minutes, 50 g. hot water were added to dissolve D–GA–HCl, and the mixture was filtered two minutes later.

The recovered solids were washed with cold water and dried, and found to consist essentially of 20.5 g. L-glutamic acid having an optical purity of 96.3%. The combined filtrate and washings weighed 290 g. and contained 18.9 g. D–GA as calculated from optical rotation values.

EXAMPLE 13

10 g. L–GA seed crystals were added to another 236 g. batch of a saturated solution of DL–GA–HCl and DL–GA as described in Example 12. The mixture was cooled with agitation from 60° C. to 35° C., wheeafter 32 g. DL–GA monohydrate in crystalline form were added over a period of four hours with agitation. Agitation was continued for another 30 minutes, and the mixture was then filtered.

The recovered, washed, and dried solids contained 39 g. GA and 35.6 g. GA–HCl. The latter dissolved when the crystal mixture was stirred with 100 g. DL–GA solution saturated at 40° C. for two minutes. The remaining solid material was filtered off, washed with cold water, and dried. It weighed 38.5 g. and consisted essentially of L-GA having an optical purity of 94.8%. 26 g. D-GA as the salt were found in the liquid phase.

EXAMPLE 14

A solution saturated at 30° C. was prepared from 141 g. $NH_4$-DL-G monohydrate, 11 g. DL-GA monohydrate, and 86 g. water. It was mixed with 10 g. L-GA and 5 g. $NH_4$-D-G monohydrate in crystalline form, and the slurry so obtained was gradually mixed over a period of 10 hours with 14.2 g. aqueous 50% sulfuric acid while 57.1 g. water was removed at a constant rate by vacuum evaporation. Agitation was continued thereafter for 30 minutes at constant temperature, 50 g. hot water were added, and the mixture was filtered two minutes later.

The recovered solids were found to weigh 36.3 g. and essentially to consist of L-GA having an optical purity of 95.3%. The filtrate combined with the washings contained 28.5 g. D-GA in the form of its salt.

EXAMPLE 15

DL-$NH_4$-G monohydrate, DL-GA, and an amount of water insufficient to dissolve the crystals were agitated at 60° C., and the supernatant saturated solution weighing 283 g. was mixed with 10 g. L-GA seed crystals. The slurry was cooled at a uniform rate from 60° C. to 30° C. while 20.2 g. aqueous 50% sulfuric acid were added gradually with agitation. Agitation at 30° C. was then continued for 30 minutes, 50 g. hot water were added, and the mixture was filtered two minutes later.

The recovered crystals, when washed with methanol and dried, weighed 40.3 g. and consisted essentially of L-GA having an optical purity of 94.6%. The combined filtrate and washings weighed 431 g. and contained 28.1 g. D-GA as determined from optical rotation.

EXAMPLE 16

A solution prepared from 167 g. $NH_4$-DL-G monohydrate and 83 g. water was mixed at 40° C. with 10 g. $NH_4$-D-G monohydrate crystals and 81 g. DL-GA monohydrate. The resulting slurry was mixed over a period of eight hours with gaseous ammonia in a total amount of 5.1 liters, as determined at 0° C. and 1 atmosphere pressure, and agitated at 40° C. Agitation was continued for 30 minutes thereafter at the same temperature, 50 g. hot water were added, and the mixture was filtered two minutes later.

The recovered solids were washed with methanol and dried. They weighed 28.7 g. and essentially consisted of L-GA having an optical purity of 92.3%. The combined filtrate and washings weighed 401 g. and contained 34.6 g. D-GA essentially in the form of its salt.

EXAMPLE 17

Eight liters of a hot aqueous solution prepared from 864 g. DL-GA crystals and 1448 g. Zn-DL-G crystals and having a pH of 4.2 were placed in a 10-liter vessel equipped with an agitator and cooled to 60° C. whereupon 300 g. L-GA seed crystals retained on a 60 mesh screen and 500 g. Zn-D-G crystals having a particle size of 150-200 mesh were added. Cooling was then continued with agitation for six hours whereby the temperature dropped gradually to 30° C.

The mixture in the vessel was then agitated at high speed to suspend the crystals of L-GA of lower specific gravity in the liquid, and the liquid carrying the suspended crystals was decanted into another vessel. The crystals were permitted to settle there, and the liquid was returned to the heavier Zn-D-G dihydrate crystals in the first vessel. This procedure was repeated five times until the two crystalline components were practically completely separated from each other.

The Zn-D-G dihydrate crystals were washed with a little cold water and dried. They weighed 944 g. and had an optical purity of 99.0%. The L-GA crystals of lower specific gravity were similarly washed and dried and weighed 565 g. They essentially consisted of L-GA having an optical purity of 98.5%.

When the above crystallization procedure was repeated, but the two crystal crops were separated by means of an 80 mesh screen, the two fractions obtained were substantially identical with those recovered on the basis of the different specific gravity of Zn-G and GA.

It will be appreciated from the preceding examples that many specific process conditions may be chosen freely without materially affecting the basic features of this invention.

The solutions may be made supersaturated with respect to a solute which it is desired to crystallize in any conventional manner. Glutamic acid monohydrate is unstable at temperatures above 20° C. and is converted to the anhydrous form. The concentration of the latter in a solution warmer than 20° C. may thus be increased beyond saturation by dissolving crystalline GA monohydrate in the solution. Similarly, the concentration of GA may be raised beyond the saturation value by reaction of an acid with a glutamate simultaneously present in the solution or by the reaction of alkali with a salt of glutamic acid with a strong acid. Supersaturation may also be achieved by removing water from a solution, by lowering the temperature of a saturated solution, or by adding an organic non-solvent, as is well known in itself. The manner in which a solution is made supersaturated with GA or with its salt in the method of the invention is thus not critical, and will readily be chosen by those skilled in the art to suit specific conditions and a desired result.

The seeding process is well understood, and conventional rules and precautions apply to this method. It is thus preferred to use seed crystals which have a compact shape in order to facilitate further processing of the grown crystals. The amount of seed crystals is generally less critical in this method than in conventional optical resolution methods which employ such crystals. The amount of seed crystals is preferably chosen between 5 and 100 mole percent of the compound to be seeded.

Temperature and pH of the solution are not critical as long as the solid phases which it is desired to precipitate from the solution are stable in the presence of the solution during crystallization. For the sake of convenience and for higher resolution rates, it is preferred to crystallize glutamic acid and/or its salts at elevated temperature in the method of this invention. Temperatures between room temperature (about 20° C.) and 100° C. are generally practical.

The optical purity of the two crystal crops which are characteristic of this invention is directly related to the equilibrium of the enantiomorphs in the solution. The initial concentration of the two compounds and the rate of crystallization of the two optically active compounds should be controlled accordingly, as illustrated in the examples, so as to hold the optical activity of the mother liquor as close to zero as is practical.

It should be understood, of course, that the foregoing disclosure relates only to preferred embodiments of the invention, and numerous modifications and alternations may be made therein without departing from the spirit and scope of the invention as set forth in the appended claims.

What is claimed is:
1. A method of optically resolving DL-glutamic acid or a salt of DL-glutamic acid which comprises:
   (a) preparing an aqueous solution of two compounds,
      (1) said compounds being DL-glutamic acid and a salt of DL-glutamic acid selected from the group consisting of water-soluble glutamates and water-soluble strong acid salts of glutamic acid,
      (2) said salt when in the solid form being a mechanical mixture or a conglomerate of the optionally active enantiomorphs of said salt, and not a racemate;

(b) making said solution supersaturated with respect to one of said compounds;

(c) seeding said supersaturated solution with seed crystals of one optically active enantiomorph of said one compound;

(d) permitting said one enantiomorph to crystallize on said seed crystals to form a first crop of crystals, whereby the solubility of the corresponding optically active enantiomorph of the other compound in the residual solution is increased, and the solubility of the opposite, optically active enantiomorph of said other compound in said residual solution is decreased;

(e) making said residual solution supersaturated with respect to said other compound until a second crop of crystals of said opposite enantiomorph is formed; and (f) separating one of said crops of crystals from the residual solution and from the other crop of crystals, said supersaturated residual solution being compatible with the crystals of said crops.

2. A method as set forth in claim 1, wherein said supersaturated solution is saturated with said other compound when the solution is being seeded with said seed crystals, said residual solution being made supersaturated with respect to said opposite enantiomorph by said crystallizing of said one enantiomorph.

3. A method as set forth in claim 1, wherein said supersaturated residual solution is seeded with crystals of said opposite enantiomorph to induce formation of said second crop.

4. A method as set forth in claim 1, wherein the temperature of said supersaturated solution and the temperature of said residual solution are above 20° C.

5. A method of optically resolving DL-glutamic acid or a salt of DL-glutamic acid which comprises:

(a) preparing an aqueous solution of two compounds,
  (1) said compounds being DL-glutamic acid and a salt of DL-glutamic acid selected from the group consisting of water-soluble glutamates and water-soluble acid salts of glutamic acid,
  (2) said salt when in the solid form being a mechanical mixture or a conglomerate of the optically active enantiomorphs of said salt, and not a racemate;

(b) making said solution supersaturated with respect to one of said compounds;

(c) seeding said supersaturated solution with crystals of one optically active enantiomorph of said one compound;

(d) permitting said one enantiomorph to crystallize on said seed crystals to form a first crop of crystals, whereby the solubility of the corresponding optically active enantiomorph of the other compound in the residual solution is increased, and the solubility of the opposite, optically active enantiomorph of said other compound in said residual solution is decreased;

(e) contacting said residual solution with said other compound in the crystalline, solid state until said corresponding enantiomorph is dissolved from said solid compound in an amount sufficient so that a residual second crop of crystals enriched with said opposite enantiomorph is left in the solid state; and (f) separating one of said crops of crystals from the residual solution and from the other crop of crystals, said residual solution being compatible with the crystals of said crops.

6. A method as set forth in claim 5, wherein said supersaturated solution is saturated with said other compound when the solution is being seeded with said seed crystals, said residual solution being made supersaturated with respect to said opposite enantiomorph by said crystallizing of said one enantiomorph.

7. A method as set forth in claim 5, wherein the temperature of said supersaturated solution and the temperature of said residual solution are above 20° C.

8. A method as set forth in claim 5, wherein said residual solution is contacted with said other compound until a portion of said opposite enantiomorph is precipitated from said residual solution in the solid state.

9. A method as set forth in claim 5, wherein said other compound is DL-glutamic acid and is a conglomerate of D-glutamic acid and L-glutamic acid in said crystalline solid state.

References Cited
UNITED STATES PATENTS 3,450,751  6/1969  Noyori et al. ____ 260—429.9 X TOBIAS E. LEVOW, Primary Examiner H. M. S. SNEED, Assistant Examiner U.S. Cl. X.R.

260—534 G